June 24, 1930.    D. W. THOMAS    1,765,807
APPARATUS FOR MAKING FLANGED METAL SPIDERS
Filed Feb. 20, 1929    5 Sheets-Sheet 1

Inventors
David W. Thomas
By
Evans & McCoy
Attorneys

June 24, 1930. D. W. THOMAS 1,765,807
APPARATUS FOR MAKING FLANGED METAL SPIDERS
Filed Feb. 20, 1929 5 Sheets-Sheet 2

Inventors
David W. Thomas

By Evans & McCoy
Attorneys

June 24, 1930.  D. W. THOMAS  1,765,807
APPARATUS FOR MAKING FLANGED METAL SPIDERS
Filed Feb. 20, 1929   5 Sheets-Sheet 3

Inventor
David W. Thomas
By
Evans + McCoy
Attorneys

June 24, 1930. D. W. THOMAS 1,765,807
APPARATUS FOR MAKING FLANGED METAL SPIDERS
Filed Feb. 20, 1929 5 Sheets-Sheet 5
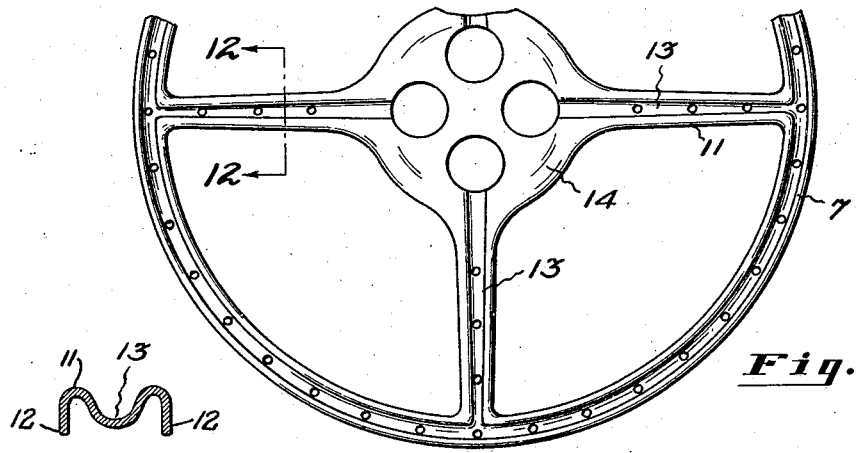
Fig. 11.
Fig. 12.
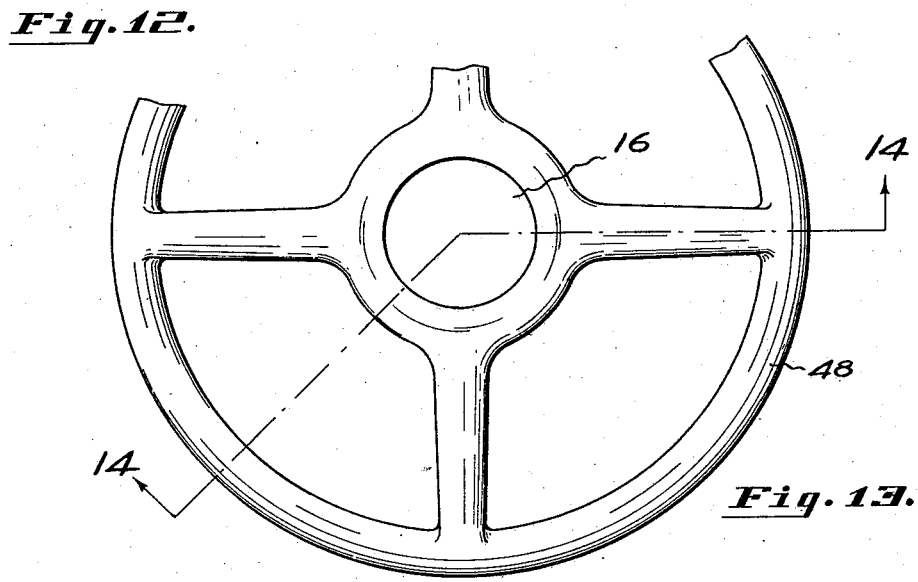
Fig. 13.
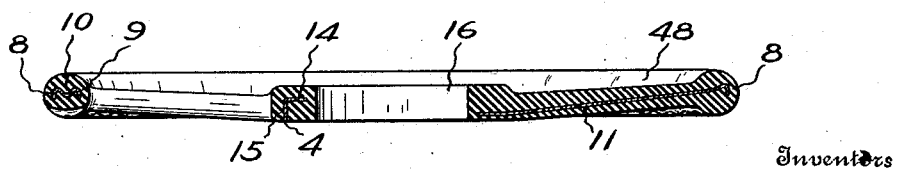
Fig. 14.
Inventors
David W. Thomas
By
Evans & McCoy
Attorneys Patented June 24, 1930

1,765,807

UNITED STATES PATENT OFFICE

DAVID W. THOMAS, OF YOUNGSTOWN, OHIO

APPARATUS FOR MAKING FLANGED METAL SPIDERS

Application filed February 20, 1929. Serial No. 341,345.

The present invention is directed to subject matter taken from copending application Serial No. 277,138 filed May 12, 1928, by Harry A. Husted, Patent No. 1,721,664, dated July 23, 1929. This invention relates to apparatus for making flanged metal spiders and more particularly to apparatus for making one piece spiders of dished form suitable for reinforcing composition steering wheels.

The principal object of this invention is to provide apparatus by means of which spiders may be expeditiously formed in accordance with the method described and claimed in the previously mentioned copending application.

Another object is to provide apparatus for making a dished one piece spider strengthened throughout by continuous ribs or flanges whereby a spider may be produced without distortion of the rim out of round and without lateral distortion of any part of the spider due to the redistribution or flowing of metal in the forming operation.

With the above and other objects in view, the invention may be said to comprise the apparatus as illustrated in the accompanying drawings hereinafter described and particularly set forth in the appended claims, together with such variations and modifications thereof as will be apparent to one skilled in the art to which the invention appertains.

Reference should be had to the accompanying drawing forming a part of the specification, in which Figure 1 is a plan view of the flat wheel shaped blank from which the spider is formed.

Fig. 11 is a fragmentary plan view showing the completed spider.

Fig. 12 is a transverse section through one of the spokes of the spider taken on the line indicated at 12—12 in Fig. 11.

Fig. 13 is a fragmentary plan view of the reinforced composition steering wheel.

Fig. 14 is a section taken on the line indicated at 14—14 in Fig. 13.

Figure 1:
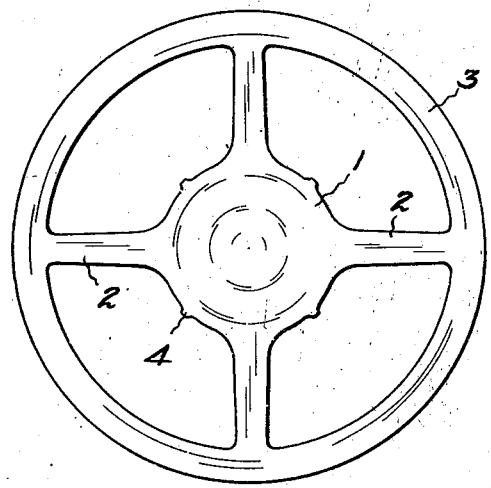
Figure 2:
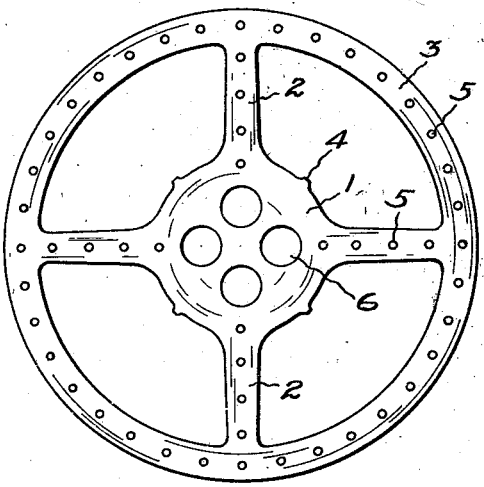
Fig. 2 is a plan view of the blank after the rim and spoke apertures and hub opening have been punched therein.
Figure 3:
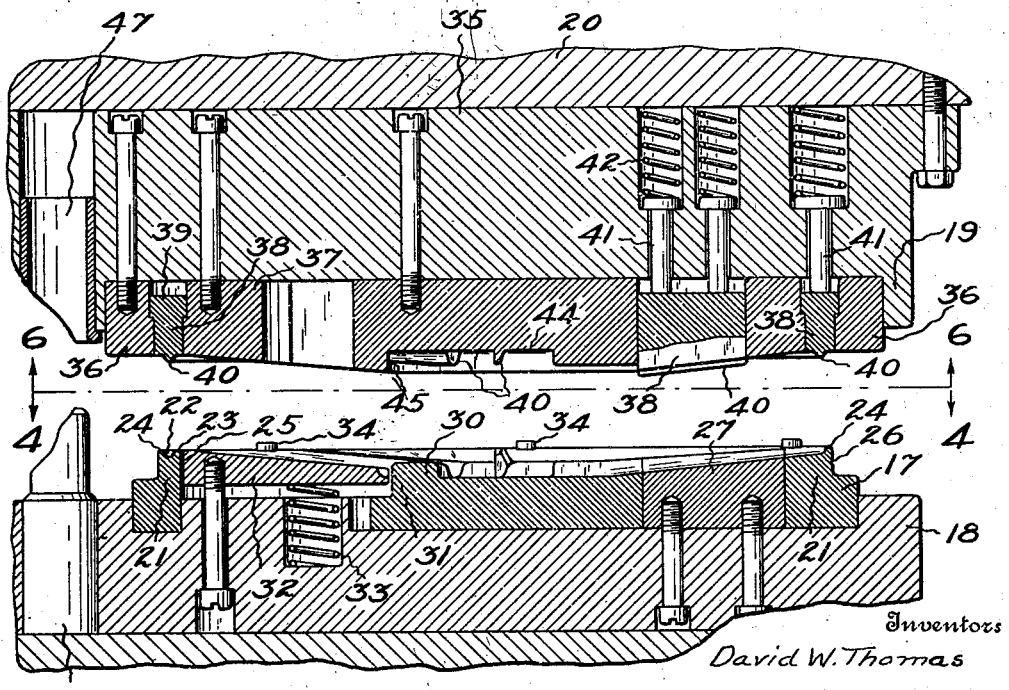
Fig. 3 is a vertical section through the dies between which the spider is formed, the section being taken on the line indicated at 3—3 in Figs. 4 and 6.
Figure 4:
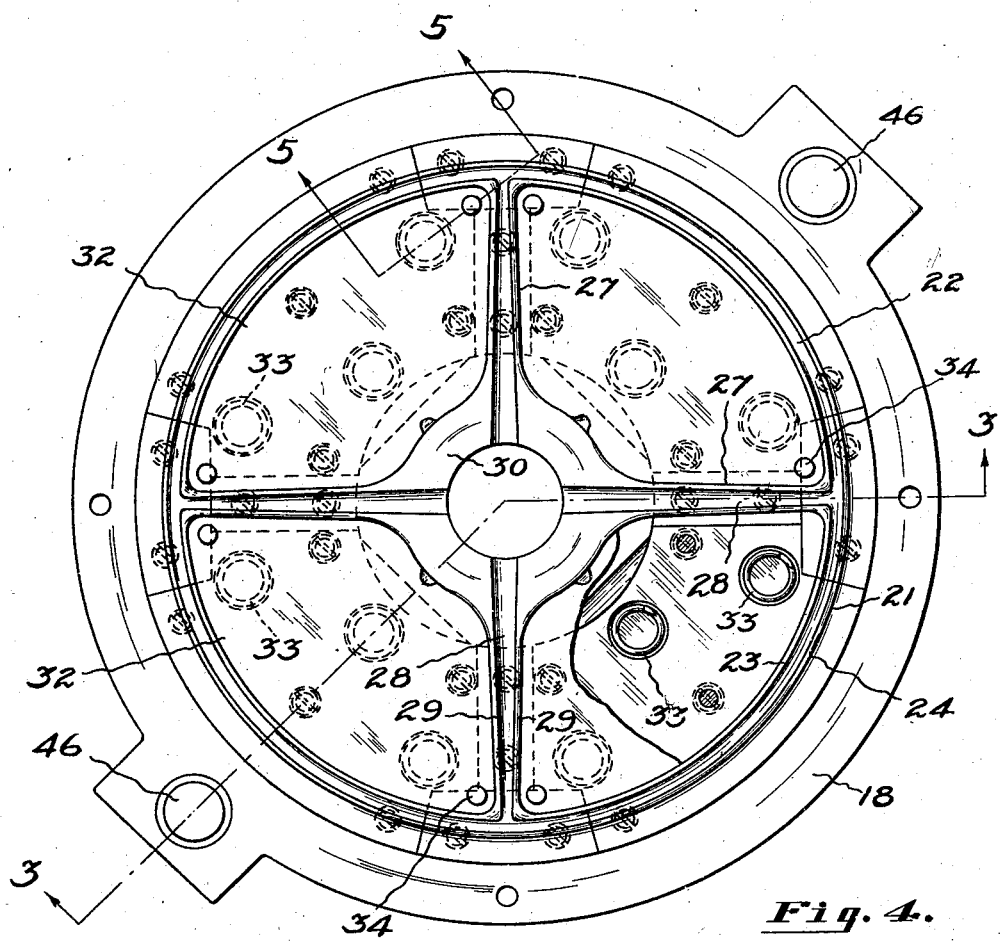
Fig. 4 is a top plan view of the bottom or stationary die viewed as indicated at 4—4 in Fig. 3.
Figure 5:
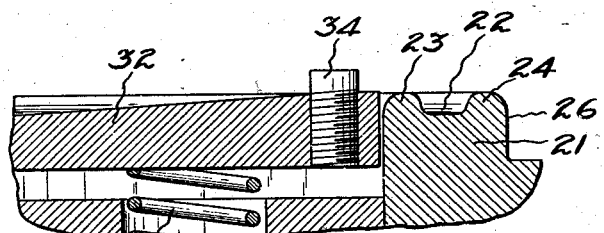
Fig. 5 is a fragmentary section taken on the line indicated at 5—5 in Fig. 4.
Figure 6:
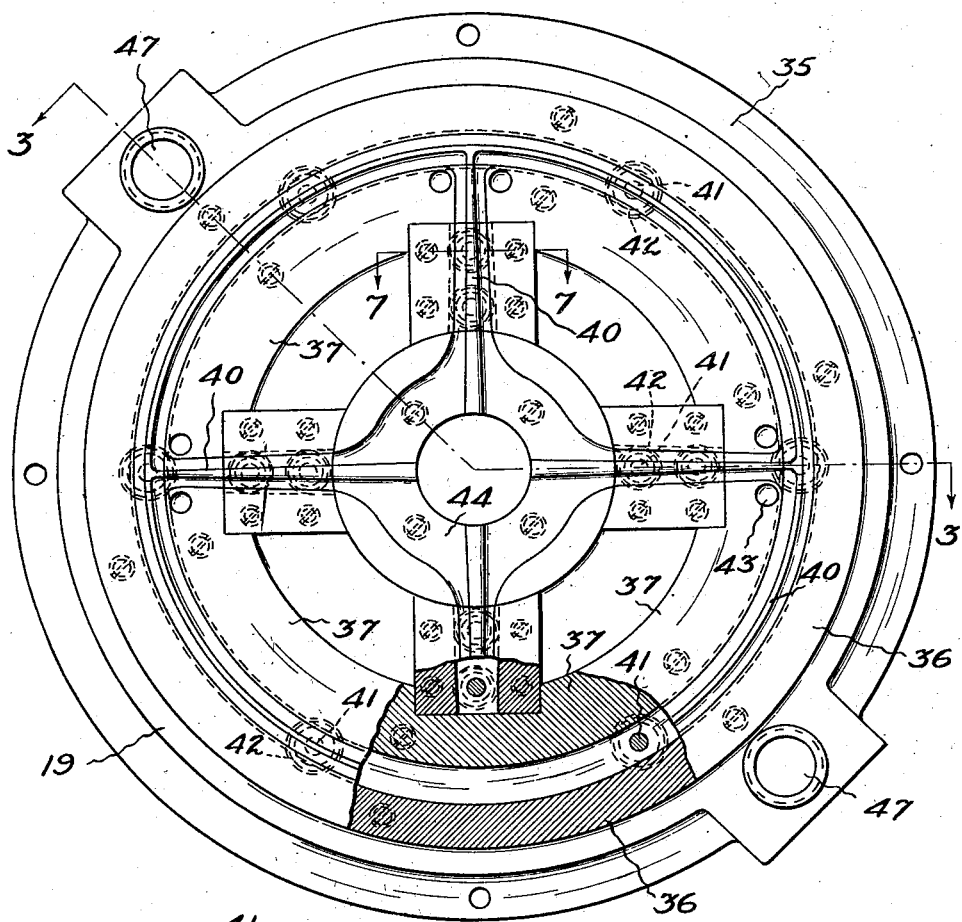
Fig. 6 is a bottom plan view of the upper movable die viewed as indicated at 6—6 in Fig. 3.
Figure 7:
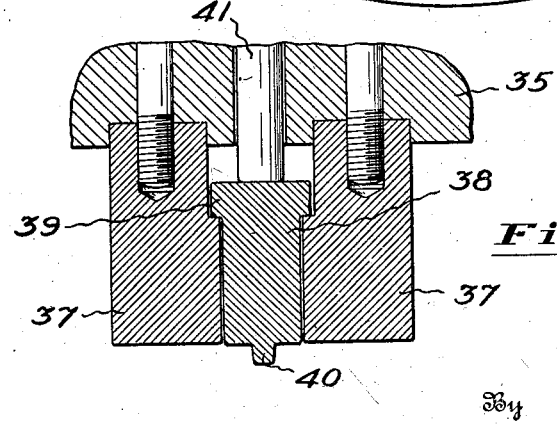
Fig. 7 is a fragmentary section taken on the line indicated at 7—7 in Fig. 6.
Figure 8:
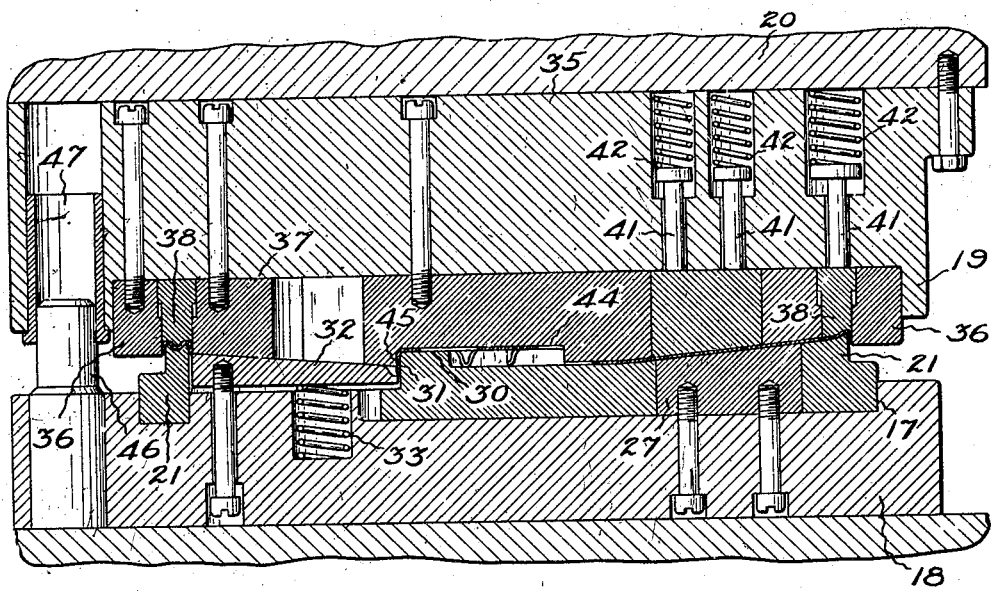
Fig. 8 is a fragmentary section through the upper die showing the upper die in full engagement with the lower die.
Figure 9:
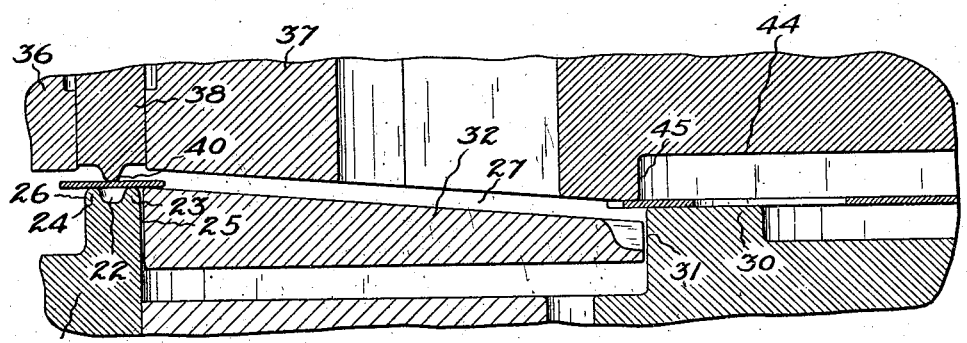
Fig. 9 is a fragmentary section showing the position of the dies with respect to the blank at the beginning of the flanging operation.

Referring to the accompanying drawings, the blank from which the spider is made is shown in Figs. 1 and 2 of the drawing. This blank is a flat one piece blank of wheel form cut from a flat metal plate and having a central hub portion 1, spoke portions 2 radiating from the hub portion and a continuous rim portion 3. The spokes 2 are preferably placed equi-angularly about the central hub portion and the hub portion of the blank between the spokes may be provided with short projections 4 for a purpose which will be hereinafter explained. As shown in Fig. 2 of the drawing, rows of small perforations are formed in the blank centrally along the rim and spoke portions, these small perforations being for the purpose of integrally uniting the composition body of the steering wheel in which the spider is embedded through the spider.

The finished spider has a relatively large central opening, but in order to avoid distortion of the hub portion during the forming operation, this opening is not formed in the blank prior to the stamping operation. But, in order to permit the metal in the hub portion to be formed without setting up internal stresses which would tend to cause distortion, a series of openings 6 are formed around the center of the hub portion within the periphery of the opening to be cut in the finished spider to lighten the hub portion without weakening it sufficiently to allow distortion during the forming operation.

As shown in Figs. 11 to 14, the completed spider has a continuous rim 7 having a continuous outer flange 8, inner flanges 9 along the inner edge thereof and a continuous corrugation 10 in the web thereof projecting in the same direction as the side flanges 8 and 9. The spokes 11 of the spider have side flanges 12 and longitudinal corrugations 13 formed in the webs thereof. The hub 14 of the spider has an outer flange 15 and a central opening 16 formed by cutting away the central portion containing the openings 6. The flanges of the rim, spokes and hub all extend laterally of the spider in the same direction, the flanges 12 of the spokes being continuous with the inner flanges 9 of the rim and with the flanges 15 of the hub. The corrugations 13 of the spokes merge into the corrugation 10 of the rim and extend through the hub portion to the central opening 16. The spider is thus uniformly strengthened throughout by the continuous flanges and corrugations. As shown in Fig. 14, the reinforcing spider is of dished form, the hub portion 14 being offset laterally with respect to the plane of the rim portion and the spokes 11 being inclined from the rim portion to the spoke portion.

The present invention provides apparatus by which the reinforcing spider shown in Figs. 11 to 13 may be formed from the flat metal blank shown in Figs. 1 and 2 without distortion of any part thereof, the rim portion 3 being held against distortion of any part thereof out of the plane of the rim and the hub and rim being accurately formed and centered with respect to the axis of the spider.

In forming the spider from the flat metal blank, the blank is placed between a pair of dies which conform to opposite side faces of the spider and these dies are so constructed and operated that prior to the flanging of the blank, the blank is pressed to dish form. During the dishing of the blank, the rim portion of the blank is positively held to its original diameter so that the lateral movement of the hub portion of the blank with respect to the rim portion thereof causes the spoke portions of the blank to be stretched slightly to permit the lateral offsetting of the hub portion with respect to rim portion while the rim portion remains at its original diameter. After the dishing of the blank, the dies are brought into full engagement simultaneously flanging and corrugating the hub, spoke and rim portions of the spider. Distortion of the hub portion of the spider during the dishing and flanging operations is prevented by reason of the openings 6 formed in the hub which reduce the rigidity of the hub portion sufficiently to permit the hub portion to be readily pressed to its final shape without setting up excessive internal stresses, but which also leave integral web portions across the center of the hub portion of the blank, which hold the peripheral portions of the hub between the spokes against distortion during the forming operation.

Dies suitable for forming a flanged spider from a flat blank in accordance with the method of the present invention are shown in Figs. 3 to 10 of the drawing, these dies comprising a lower stationary die 17 fixed to the bed 18 of a suitable press and a movable upper die 19 secured to the movable head 20 of the press.

The lower die 17 has a peripheral rim engaging portion in the form of a fixed annular upwardly projecting rib 21 which has a continuous corrugation forming groove 22 in its upper edge which provides inner and outer annular ribs 23 and 24 along the upper edge of the rib 21. The rib 21 fits within the channel of the rim 7 of the spider and has vertical inner and outer walls 25 and 26 against which the side flanges 8 and 9 of the rim are formed. The bottom die also has stationary radial spoke engaging ribs 27 which slope downwardly from the rim engaging rib 21 toward the center of the die and which are provided along their upper edges with corrugation forming channels 28 and side ribs 29, the ribs 27 being formed to fit within the channels of the spokes of the spider. The stationary die is also provided with a raised hub forming portion 30 which is disposed at a lower level than the peripheral rim engaging rib 21 of the die. The hub forming portion 30 of the lower die has a top surface which conforms to the bottom surface of the hub of the spider and has vertical peripheral wall portions 31 between the spokes against which the outer flanges 15 of the spider are formed. In the spaces of the die between the spoke forming ribs 27 and between the rim forming rib 21 and hub forming portion 30, the bottom die is provided with segmental cushion plates 32 which are supported upon compression coil springs 33. The upper faces of the plates 32 are inclined downwardly from adjacent the rim engaging rib 21 to the hub portion 31 and are normally supported by the springs 33 with their outer edges substantially flush with the top of the rib 21 and with their side edges flush with the tops of the spoke forming ribs 27. The cushion plates 32 carry upwardly projecting positioning studs 34 on opposite sides of each of the spoke engaging ribs 21 and adjacent the outer edges of the plates. The positioning studs are so located that when the flat blank is placed on the lower die, the studs engage the opposite edges of the spoke portions of the blank adjacent the rim and also engage the inner edge of the rim portion to prevent the rim portion from being drawn inwardly during the initial portion of the compression stroke, while the hub portion of the blank is being forced downwardly into engagement with the hub forming portion 30 of the die. The annular rim forming rib 21, the radial spoke forming ribs 27 and the hub forming portion 30 of the bottom die form a wheel shaped concave die conforming to the under face of the spider throughout and upon which the spider is formed by the action of the upper movable die.

The upper die 19 consists of a bed plate 35 rigidly secured to the movable head 20 and this bed plate has rigidly attached thereto an outer annular flanging die 36 which projects downwardly from the plate and has an internal diameter slightly greater than the external diameter of the annular rib 21 of the lower die to accommodate the outer flange of the spider between its inner face and the outer face of the rib 21. Also, rigidly secured to the bed plate 35 within the annular flanging die 36 are segmental flanging dies 37 which have a shape corresponding to the shape of the openings between the spokes of the completed spider, the flanging dies 37 being spaced inwardly from the outer flanging die 36 a distance corresponding to the width of the rim of the spider to accommodate the rib 21 and the flanges of the rim of the spider between them and being spaced from each other a distance corresponding to the width of the spider to accommodate the spoke forming ribs 27 and the flanges of the spokes of the spider between them. In the downward movement of the upper die, the outer annular flanging die 36 engages the outer edge of the rim portion of the blank and bends the same down against the outer face 26 of the rib 21 of the lower die and segmental dies 37 engage the inner edge of the rim portion of the blank, the outer edge of the hub portion and the side edges of the spoke portions thereof bending the inner edge of the rim portion against the inner face 25 of the rib 21, the outer edge of the hub portion against the outer face 31 of the hub forming portion 30 of the lower die and opposite side edges of the spoke portions against the opposite side faces of the spoke forming ribs 27 of the lower die. Mounted in the spaces between the segmental flanging dies 37 and outer annular flanging dies 36 and in the spaces between adjacent segmental dies 37, there is a corrugating die 38 in the form of a spider which has an enlarged upper portion engageable with oppositely disposed shoulders on the flanging dies 36 and 37 to limit the downward movement thereof. The corrugating die 38 is provided along the lower edges thereof with ribs 40 which are positioned to enter the grooves 22 and 28 of the ribs 21 and 27 of the lower die to form the circumferential corrugation in the rim and the radial corrugations in the spokes. The die 38 may be formed in one piece or the rim and spoke engaging portions may be formed separately. In either case, the corrugating die 38 is guided by vertical stems 41 slidably in bed plate 35 and is normally held in its lowermost position with the enlarged portion 39 thereof engaging the shoulders of the flanging dies by means of compression coil springs 42 acting upon the guide stems 41. The upper die 19 is provided with apertures 43 to receive the positioning studs 34 of the lower die so that the cushioning plates 32 are maintained in engagement with the blank during the initial engagement of the upper die with the blank to force the hub portion of the blank down into engagement with the hub forming portion 30. The upper die has a hub forming portion 44 which is lower than the outer flanging die 36 and the spoke engaging portions of the upper die are inclined downwardly toward the center of the die. The hub forming portion 44 is recessed to receive the hub portion of the finished spider and the inner portions of the spokes of the spider, being provided with flanging portions 45 which cooperate with the hub forming portion 30 of the lower die to bend the outer edge portions of the hub into engagement with the outer face 31 of the hub forming portion 30. The upper die is maintained in proper alinement with the lower die during the forming operation by means of guide pins 46 fixed to the bed and slidably fitting into sockets 47 carried by the bed plate 35 of the upper die.

Figure 10:
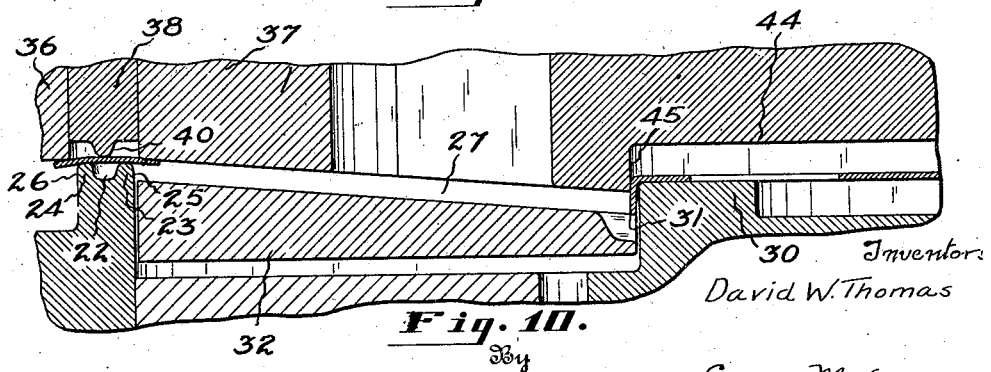
Fig. 10 is a sectional view similar to Fig. 9, showing a position of the dies with respect to the blank during the flange forming portion of the stroke.

In the operation of the machine, a flat blank such as shown in Fig. 2 is placed on the lower die with its rim portion 3 resting upon the top of the annular rib 21 and with the outer ends of the spoke portions lying between positioning studs 34 on the cushioning plates 32. As the upper die is brought down into engagement with the blank, the central hub flanging portion of the upper die first engages the hub portion of the blank and forces the hub portion down into engagement with the hub forming portion 30 of the lower die. This lateral displacement of the hub portion of the blank with respect to the rim portion would normally draw the rim portion of the blank inwardly at the ends of the spokes and distort the rim portion, but this is prevented by the positioning studs 34 which positively hold the rim portion 3 of the blank against inward movement so that the spoke portions of the blanks are stretched slightly, as the blank is pressed into dished form. When the hub portion of the blank has been brought to a position against the upper surface of the hub forming portion 30 of the lower die, the corrugating ribs 40 of the upper die will be in engagement with the rim portion of the blank throughout its periphery and with the spoke portions thereof throughout their length and the inner edge portion of the rim, the outer edge of the hub portion and side edges of the spoke portions being clamped between the flanging dies 37 and cushion plates 32. Continued movement of the upper die causes the corrugating die 38 to be moved upwardly with respect to the flanging dies against the pressure of the springs 42 until the flanging dies 36 and 37 and hub flanging portion 45 are brought into engagement with the blank, as shown in Fig. 10 of the drawing. Further, downward movement of the upper die causes the edge portions of the blank to be bent downwardly against the opposite faces of the annular rib 21 and radial ribs 27 of the lower die and against the outer face 31 of the hub forming portion 30 between the spokes. During the flanging operation, the corrugating die 38 will have reached its upper limit of movement with respect to the flanging dies 36 and 37 so that in the final portion of the movement of the upper die, the corrugating ribs 40 are forced into the grooves 22 and 28 of the lower die to form the rim and spoke corrugations. The spider is thus pressed to final dished form between the dies which press the continuous strengthening flanges and corrugations into the blank without distorting any portion thereof.

After the stamping operation above described, the central opening 16 is cut in the hub and the spider is then placed in a mold and a body of suitable initially plastic material 48 is molded around the hub spokes and rim of the spider, which composition material completely embeds the spider. The projections 4 at the outer edge of the hub portion of the blank form projections on the hub flange 15 which serve as supports for the spider in the mold while the composition body 48 is being applied to the spider, the lugs 4 serving to accurately space the spider with respect to the walls of the mold.

It will be apparent that the present invention provides apparatus for forming a dished spider which is strengthened throughout with continuous reinforcing flanges, and which enables such a spider to be made in a single stamping operation without any distortion due to the flow of metal during the forming operation, and that the apparatus of the present invention enables such reinforcing spiders to be manufactured rapidly and at a low cost. In addition, it will be apparent that the present invention provides the forming of dies of relatively simple and rugged construction capable of long service and of relatively inexpensive construction.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. Apparatus for forming flanged spiders of dished form from a metal blank having a continuous rim portion, a hub portion and spoke portions connecting the rim and hub portions, comprising a press having a bed and a movable head provided with complemental dies, one of the dies being concave and having blank engaging portions conforming to the rim, hub and spokes of the spider on one side thereof, said die also having positioning members engageable with the rim portion of the blank at circumferentially spaced points and with the spokes to hold the rim portion against inward movement and to hold the blank against angular displacement, the other of said dies being of convex form and having blank engaging portions conforming to the hub, rim and spokes of the spider on the opposite side thereof.

2. Apparatus for forming flanged spiders of dished form from a metal blank having a continuous rim portion, a hub portion and spoke portions connecting the rim and hub portions, comprising a press having a bed and a movable head provided with complemental dies, one of the dies being concave and having blank engaging portions conforming to the rim, hub and spokes of the spider on one side thereof, said die having yieldably supported cushioning plates in the spaces between the spoke engaging portions, said plates having positioning members engageable with the inner edge of the rim portion of the blank at circumferentially spaced points and with opposite edges of the spoke portions of the blank, the other of said dies being of convex form and having blank engaging portions conforming to the hub, rim and spokes of the spider on the opposite side thereof.

3. Apparatus for forming flanged spiders of dished form from a metal blank having a continuous rim portion, a hub portion and spoke portions connecting the rim and hub portions, comprising a concave die, portions thereon for engagement with the lower faces of said rim, hub and spoke portions, cushioning plates supported in said die between the spoke engaging portions thereof, positioning members on said cushioning plates adapted to engage the inner edge of said rim portion of the blank at circumferentially spaced points and with opposite edges of said spoke portions of the blank to hold said rim portion against inward movement and to hold said blank against angular displacement, and a complemental convex die having portions for engagement with the upper faces of said rim, hub and spoke portions.

4. Apparatus for forming flanged spiders of dished form from a metal blank having a continuous rim portion, a hub portion and spoke portions connecting said rim and hub portions, comprising a concave die, portions thereon for engagement with the lower faces of said rim, hub and spoke portions, cushioning plates between the spoke engaging portions of said die, spring means for resiliently supporting said plates on said die, extending lugs on said cushioning plates adapted to engage the inner edge of said rim portion of the blank at circumferentially spaced points and with opposite edges of said spoke portions of the blank to hold said rim portion against inward movement and to hold said blank against angular displacement, and a complemental convex die having portions for engagement with the upper faces of said rim, hub and spoke portions.

5. Apparatus for forming flanged spiders of dished form from a metal blank having a continuous rim portion, a hub portion and spoke portions connecting the rim and hub portions, comprising a concave die, portions thereon for engagement with the lower faces of said rim, hub and spoke portions, cushioning plates supported in said die between the spoke engaging portions thereof, positioning members on said cushioning plates adapted to engage the inner edge of said rim portion of the blank at circumferentially spaced points and with opposite edges of said spoke portions of the blank to hold said rim portion against inward movement and to hold said blank against angular displacement, a complemental convex die, and spider forming members resiliently supported in said convex die for forming depressions between the edges of said rim and spoke portions of said blank.

6. Apparatus for forming flanged channeled spiders of dished form from a one piece metal blank having integral rim, spoke and hub portions, comprising a convex die, a spider dishing portion thereon, spider flanging and channeling portions on said die, a complemental concave die having portions engaging said rim, hub and spoke portions of said blank, cushioning plates between said spoke engaging portions resiliently supported on said concave die, and extending lugs on said plates adapted to engage the inner edge of the rim portion of said blank at circumferentially spaced points and with opposite edges of the spoke portions of said blank for holding said rim against inward movement and for holding said blank against angular displacement while said dishing portion of said convex die is forming said blank to dished shape.

In testimony whereof I affix my signature.
DAVID W. THOMAS.